United States Patent [19]

Wu et al.

[11] 4,412,061

[45] Oct. 25, 1983

[54] PROCESS FOR THE PREPARATION OF A POLYAMIDE FROM UNSATURATED NITRILE, LACTAM AND WATER

[75] Inventors: Mu-Yen M. Wu; Lawrence E. Ball, both of Cuyahoga Falls, Ohio

[73] Assignee: The Standard Oil Company, Cleveland, Ohio

[21] Appl. No.: 219,782

[22] Filed: Dec. 24, 1980

[51] Int. Cl.³ .............................................. C08G 69/16
[52] U.S. Cl. .................................. 528/315; 528/271; 528/323; 528/326
[58] Field of Search ................ 528/323, 326, 315, 271

[56] References Cited

U.S. PATENT DOCUMENTS 2,691,643 10/1954 Chirtel et al. ...................... 528/328
3,499,879 3/1970 Kobayashi et al. ................. 528/310
3,629,203 12/1971 Volker et al. ...................... 528/310

*Primary Examiner*—Harold D. Anderson
*Attorney, Agent, or Firm*—William D. Mooney; Herbert D. Knudsen; Larry W. Evans

[57] ABSTRACT

This invention relates to a new process for preparing a copolyamide comprising polymerizing an alpha, beta-unsaturated nitrile and water with a molar excess of a lactam. In one embodiment, acrylonitrile, water and caprolactam are polymerized to form a nylon-3,6.

12 Claims, No Drawings

PROCESS FOR THE PREPARATION OF A POLYAMIDE FROM UNSATURATED NITRILE, LACTAM AND WATER

BACKGROUND OF THE INVENTION

This invention relates to a new process for preparing a copolyamide comprising polymerizing an alpha, beta-unsaturated nitrile, water and a lactam.

The preparation of a polyamide from acrylonitrile and water is disclosed in U.S. Pat. Nos. 3,629,203 and 3,499,879. The ring opening addition polymerization of caprolactam is also known and is carried out by adding a catalytic amount of water to open the ring and then later removing the water at an elevated temperature. Surprisingly, applicants have discovered that although these polymerizations proceed by different mechanisms the alpha, beta-unsaturated nitrile, water and lactam can be polymerized together to form a copolymer under the appropriate reaction conditions.

The process of this invention results in high yields of a copolyamide which has particularly good physical properties. Moreover, the percent water insolubility and the structure of the resultant copolyamide can be varied by varying the reaction conditions.

SUMMARY OF THE INVENTION

It has now been discovered that copolyamides can be prepared by a process comprising polymerizing an alpha, beta-unsaturated nitrile, water and a lactam. More particularly, it has been discovered that a copolyamide containing both three carbon and six carbon carbonamide repeating units can be prepared by polymerizing acrylonitrile and water with a molar excess of caprolactam.

DETAILED DESCRIPTION

The Polymer

The copolyamides obtained by the process of this invention are generally defined as containing carbonamide repeating units as follows:

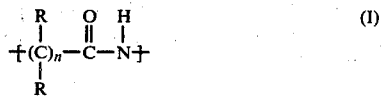

(I)

wherein R is a suitable substituent and n is 2–11. Each copolyamide will contain at least two different carbanamide repeating units. Preferred copolyamides are those wherein R is hydrogen and n is 2 and 5.

The copolyamides of this invention can be polymerized with other monomers and/or resins. These monomers and/or resins are selected from the group consisting of polyamides such as nylon-3, nylon-4, nylon-6, nylon-6,6, nylon-6,10, nylon-11, nylon-12, or monomers thereof such as ammonium acrylate; esters such as methyl acrylate; unsaturated acids or salts thereof; and vinyl monomers such as acrylamide.

The properties of the copolyamides obtained by the inventive process vary depending upon the amount and identity of the monomers used and the reaction conditions. The preferred polyamides are melt processable without decomposition and highly crystalline.

Reactants

The inventive process is a copolymerization of an alpha, beta-unsaturated nitrile, water and a lactam.

Any alpha, beta-unsaturated nitrile can be polymerized in accordance with this invention. The preferred nitriles contain less than 40 carbon atoms and are represented by the following formula:

(II)

wherein each $R_1$ is independently selected from the group consisting of
  (1) hydrogen; and
  (2) $C_{1-30}$ alkyls.

More preferred nitriles are those wherein each $R_1$ is independently selected from hydrogen and $C_{1-4}$ alkyls. Examples of these nitriles include acrylonitrile and methacrylonitrile.

Any lactam can be used as a comonomer in the instant invention. The preferred lactams contain less than 40 carbon atoms and can be represented by the following formula:

(III)

wherein x is 3 to 11 and wherein each $R_2$ is independently selected from the group consisting of:
  (1) hydrogen; and
  (2) $C_{1-30}$ alkyls.

More preferred lactams are those wherein x is 3 to 5 and $R_2$ is hydrogen or a $C_{1-4}$ alkyl. Examples of these lactams include caprolactam and pyrrolidone.

This process works best when a molar excess of the lactam is present. Theoretically, all that is needed for the polymerization is one mole of lactam per mole of acrylonitrile and water. However, it has been found that at equal molar ratios, the copolyamide formed has a low molecular weight and takes a long time to form. Therefore, the molar ratio of the nitrile to the lactam is preferably less than 1 to 1, more preferably less than 0.5 to 1.

The third monomer component is water. The ratio of the nitrile to the water is preferably about 1 to 1.

Other monomers or polymers can also be polymerized with the nitrile, water and lactam in ths process. For example, ammonium acrylate, a nylon-3 monomer, can be polymerized with the nitrile and lactam to produce a copolyamide. Since one mole of water is generated when one mole of ammonium acrylate is polymerized to a polyamide, it is only necessary to add enough water so that there is a total of one mole of water, from the ammonium acrylate polymerization and from the added water, for every one mole of the nitrile. Preferably, the molar ratio of the nitrile to the ammonium acrylate is about 1 to 1, and thus it is not necessary to add any water. In this monomer system, the ratio of the nitrile to the lactam can vary widely and ratios of less than 1 to 1 can be used to prepare copolyamide. It is preferred to use a ratio of less than 1 to 2. For the purpose of this invention, any ammonium salt of an alpha, beta-unsaturated carboxylic acid can be used instead of the ammonium acrylate.

Process Conditions

The process of this invention can be conducted under a broad range of process conditions. It is important to maintain suitable contact between the monomers so that the desired polymerization can occur. Although suitable contact time can be established when the monomers are in the solid, liquid or gaseous phase, it is preferred to perform the polymerization in the liquid phase. This liquid phase can be obtained by various methods including the use of solvents.

In the preferred practice of the invention, the monomers are maintained at a temperature above their melting points but below the decomposition temperature of the monomers or product polymers, which is generally about 350° C. It is more preferred to conduct this process at a temperature between 125° C. and 250° C., and conducting the process between 150° C. and 200° C. is most preferred.

The time required for the instant polymerization process will depend upon various process parameters. For example, at low temperatures it will take longer for the copolyamide to form than at high temperatures. In general, the reaction is conducted in less than 48 hours with times ranging from 8 to 24 hours normally being adequate to produce polymers.

Although the monomers can be polymerized in contact with the atmosphere, a more desirable group of copolyamides having high intrinsic viscosities and molecular weights are obtained by carrying out the polymerization in the absence of oxygen. This can be achieved by blanketing the reaction mixture with either an inert gas such as nitrogen or with gaseous ammonia.

The instant polymerization can proceed at atmospheric, superatmospheric or subatmospheric pressure. Preferably, the monomers are heated under superatmospheric pressures. It has been found that at pressures such as 0 to 5,000 psig are preferable with 50 to 2,000 psig being most preferable.

The polymerization process of this invention can proceed by any of the generally known modes of polymerization including bulk, slurry, suspension or solution polymerization by batch continuous or intermittent addition of the monomers and other components.

It is often convenient to carry out the instant polymerization in the presence of a diluent which may also be a solvent to the monomers, products or both. Inert diluents which can be used in the process of this invention include hydrocarbons such as benzene, toluene, xylene, ethyl benzene, solvent naphtha, n-hexane, cyclohexane, isooctane and decalin; ether such as dioxane, diethyl ether, dibutyl ether and dimethoxy ethane; aromatic halogenated compounds such as chlorobenzene and dichlorobenzene. In addition to these organic solvents, an anhydrous solvent such as liquid ammonia may also be used.

The polymerization conditions have a large effect on the physical properties of the resultant copolyamide. Lower polymerization temperature, increased polymerization time and catalysts favor the formation of a copolyamide containing higher percentages of a carbanamide comprising three carbons. Increased polymerization time favors formation of higher molecular weight copolyamides.

Certain catalysts have been found to be effective in the instant process. These catalysts comprise tertiary amines such as tripentylamine and tripropylamine.

Recovery

At the end of the polymerization, the unreacted monomers are removed from the reaction mass by suitable means, e.g. distillation, extraction with a solvent or mixture of solvents or by combination of such techniques. The unreacted material may be removed in conjunction with removal of low molecular weight polymers, if desired. Any suitable solvent or mixture of solvents may be employed in purifying the crude reaction product. The reaction of the solvent is more or less selective. If the polymerization reaction is carried out in the inert organic diluent in which the polymer is insoluble, the polymer will precipitate and may be removed by filtration, centifigation, etc. The polymer which is obtained may easily be purified by extracting it with a liquid that is a solvent for the monomer but which is not a solvent for the polymer. Frequently, water is used for this purpose.

The polymers produced herein have a wide variety of applications. Generally, they may be used in any application calling for a polyamide. For example, these copolyamides can be used as fibers, plastics, films and molding resins.

SPECIFIC EMBODIMENTS

In order to provide a better understanding of the present invention, the following working examples are presented. In each of the examples, the polymer formed was identified by various analytical techniques as a copolyamide.

EXAMPLE 1

The monomers, acrylonitrile and water and caprolactam, were charged into a 1 liter non-stirred autoclave reactor in a molar ratio of 1½. The autoclave was purged with nitrogen for 2 minutes and then pressurized. The polymerization proceeded for 2 hours at 160° C. and then for 22 hours at 210° C. The reactor was cooled and opened and the polymer was broken into small pieces and then water extracted for 24 hours. The water insolubility was found to be 42.4% and the polymer comprised 20% 3-carbon carbonamides and 80% 6 carbon carbonamides.

EXAMPLES 2–8

The procedure of Example 1 was repeated. The polymerization conditions and the structure of the resultant copolyamide is shown in Table I.

TABLE I

Preparation of Copolyamides

| Ex | Reactants | Molar Ratio | React Temp/ Time (°C./Hr) | % H2O In- solub | Melt Point (°C.) | Struc.** | % Crystal |
|---|---|---|---|---|---|---|---|
| 1 | Acrylo/ water/ caprolactam | 1/1/2 | 160/2 210/22 | 42.4 | 155 | 20/80 | 40.30 |
| 2 | Acrylo/ water/ caprolactam | 1/1/2 | 140/2 180/22 | 22.5 | 160 | 24/76 | 43.1 |
| 3 | Acrylo/ water/ capro- | 1/1/2 | 189/24 230/16 | 45.3 | 155 | 22/78 | 42.4 |

TABLE I-continued
Preparation of Copolyamides

| Ex | Reactants | Molar Ratio | React Temp/Time (°C./Hr) | % H2O In-solub | Melt Point (°C.) | Struc.** | % Crystal |
|---|---|---|---|---|---|---|---|
| 4 | Acrylo/water/caprolactam | 1/1/3 | 193/24 | 53.1 | 165 | 16/84 | 42.3 |
| 5 | Acrylo/water/caprolactam | 1/1/3 | 160/2 195/22 | 60.2 | 155 | 11/89 | 41.6 |
| 6 | Acrylo/water/caprolactam | 1/1/3 | 175/24 200/16 | 68.0 | 155 | 19/81 | 42.7 |
| 7* | Acrylo/water/caprolactam | 1/1/2 | 160/2 205/22 | 37.0 | 145 | 30/70 | 43.5 |
| 8* | Acrylo/water/caprolactam | 1/1/3 | 193/24 | 55.7 | 155 | 26/74 | 39.6 |

*Reactor contains 5% (molar) of tripentylamine based on acrylonitrile concentration.
**Ratio of 3 carbon carbonamides to 6 carbon carbonamides in polymer backbone.

EXAMPLE 9

The monomers, i.e. acrylonitrile, ammonium acrylate and caprolactam, were changed into a 25 ml. glass ampoule in a molar ratio of 1⅛. The ampoule was purged with nitrogen for 30 seconds and sealed with a flame. The ampoule was then placed into a protective metal cage and then the cage containing the ampoule was placed in an air oven set at 175° C. for 24 hours. The ampoule was cooled and opened and the polymer was broken into small pieces and then water extracted for 24 hours. The water insolubility of this polymer was 30.4%, the crystallinity was 45.4% and the polymer comprised 32% 3-carbon carbonamides and 68% 6-carbon carbonamides.

Although only a few embodiments of this invention have been specifically described above, it should be appreciated that many additions and modifications can be made without departing from the spirit and scope of the invention. These and all other modifications are intended to be included within the scope of this invention, which is to be limited only by the following claims:

We claim:

1. A process for producing a resinous copolyamide comprising polymerizing an alpha, beta-unsaturated nitrile and water with a molar excess of a lactam.

2. The process of claim 1 wherein the alpha, beta-unsaturated nitrile is acrylonitrile.

3. The process of claim 1 wherein the lactam is caprolactam.

4. The process of claim 1 wherein said process is conducted at a temperature between 150° C. and 300° C.

5. The process of claim 1 wherein said process is carried out in the absence of oxygen.

6. The process of claim 1 wherein the ratio of the nitrile of the lactam is less than 0.5 to 1.

7. The process of claim 6 wherein the ratio is less than 0.33 to 1.

8. The process of claim 1 wherein the ratio of the nitrile to the water is about 1 to 1.

9. The process of claim 1 wherein the nitrile has the following formula:

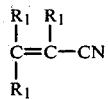

wherein each $R_1$ is independently selected from the group consisting of hydrogen and $C_{1-4}$ alkyls.

10. The process of claim 1 wherein the lactam has the following formula:

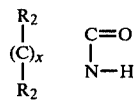

wherein each $R_2$ is independently selected from the group consisting of hydrogen and $C_{1-4}$ alkyls and x is 3 to 11.

11. The process of claim 10 wherein x is 3 to 5.

12. The process of claim 1 wherein the monomers are contacted with a tertiary amine catalyst.

* * * * *